US008671221B2

United States Patent
Shribman et al.

(10) Patent No.: US 8,671,221 B2
(45) Date of Patent: Mar. 11, 2014

(54) METHOD AND SYSTEM FOR INCREASING SPEED OF DOMAIN NAME SYSTEM RESOLUTION WITHIN A COMPUTING DEVICE

(75) Inventors: Derry Shribman, Netanya (IL); Ofer Vilenski, Netanya (IL)

(73) Assignee: Hola Networks Ltd., Netanya (IL)

( * ) Notice: Subject to any disclaimer, the term of this patent is extended or adjusted under 35 U.S.C. 154(b) by 146 days.

(21) Appl. No.: 13/034,239

(22) Filed: Feb. 24, 2011

(65) Prior Publication Data

US 2012/0124239 A1    May 17, 2012

Related U.S. Application Data

(60) Provisional application No. 61/414,641, filed on Nov. 17, 2010.

(51) Int. Cl.
G06F 15/16    (2006.01)

(52) U.S. Cl.
USPC .............................. 709/245; 709/203; 709/208

(58) Field of Classification Search
USPC ......................................................... 709/245
See application file for complete search history.

(56) References Cited

U.S. PATENT DOCUMENTS

| | | | |
|---|---|---|---|
| 5,325,508 A | 6/1994 | Parks et al. | |
| 7,299,491 B2 * | 11/2007 | Shelest et al. | 726/4 |
| 7,313,631 B1 * | 12/2007 | Sesmun et al. | 709/245 |
| 7,415,536 B2 * | 8/2008 | Nakazawa | 709/245 |
| 7,490,124 B2 * | 2/2009 | King et al. | 709/203 |
| 7,827,280 B2 * | 11/2010 | Cox | 709/225 |
| 7,836,207 B2 * | 11/2010 | Foote et al. | 709/245 |
| 7,840,678 B2 * | 11/2010 | Joshi | 709/226 |
| 7,930,428 B2 * | 4/2011 | Drako | 709/245 |
| 8,127,018 B2 * | 2/2012 | Frutiger | 709/227 |
| 8,156,243 B2 * | 4/2012 | Richardson et al. | 709/238 |
| 8,195,837 B2 * | 6/2012 | McCarthy et al. | 709/245 |
| 8,200,842 B1 * | 6/2012 | Lau | 709/245 |
| 8,266,288 B2 * | 9/2012 | Banerjee et al. | 709/226 |
| 2002/0178238 A1 | 11/2002 | Fletcher et al. | |
| 2006/0271707 A1 * | 11/2006 | Cheline et al. | 709/245 |
| 2008/0101358 A1 * | 5/2008 | Van Ewijk et al. | 370/389 |
| 2008/0162724 A1 * | 7/2008 | Hietasarka | 709/245 |
| 2010/0223621 A1 * | 9/2010 | Joshi et al. | 718/105 |
| 2010/0250668 A1 * | 9/2010 | Toebes et al. | 718/105 |
| 2011/0078229 A1 * | 3/2011 | Qiu et al. | 709/203 |
| 2011/0087769 A1 * | 4/2011 | Holmes et al. | 709/224 |
| 2011/0270964 A1 * | 11/2011 | Huang et al. | 709/224 |
| 2011/0320524 A1 * | 12/2011 | Nandagopal | 709/203 |
| 2012/0246315 A1 * | 9/2012 | Kagan | 709/225 |

* cited by examiner

*Primary Examiner* — Melvin H Pollack
(74) *Attorney, Agent, or Firm* — Peter A. Nieves; Sheehan Phinney Bass + Green PA

(57) ABSTRACT

A system for resolving domain name system (DNS) queries, contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to.

13 Claims, 11 Drawing Sheets

METHOD AND SYSTEM FOR INCREASING SPEED OF DOMAIN NAME SYSTEM RESOLUTION WITHIN A COMPUTING DEVICE

CROSS-REFERENCE TO RELATED APPLICATION

This application claims priority to copending U.S. Provisional Application entitled, "METHOD AND SYSTEM FOR INCREASING SPEED OF DNS RESOLUTION WITHIN A COMPUTING DEVICE," having Ser. No. 61/414,641, filed Nov. 17, 2010, which is entirely incorporated herein by reference.

FIELD OF THE INVENTION

The present invention is generally related to domain name system resolution, and more particularly is related to increasing the speed of domain name system resolution.

BACKGROUND OF THE INVENTION

The Internet maintains two principal namespaces, the domain name hierarchy (e.g., 'birds.images.wikipedia.org'), which is designed to be 'human readable', and the Internet Protocol (IP) address system (e.g., '207.142.131.242') which is easier for computer programs to manipulate. The Domain Name System (DNS) maintains the domain namespace and provides translation services between these two principal namespaces. The (DNS) contains Internet name servers and a communications protocol.

A DNS name server is a server that stores the DNS records required for the system and responds with answers to queries against its database. FIG. 1 is a schematic diagram providing an example of the setup and components of a typical DNS system 100. A communication device 102 requires translation of a domain name. For purposes of the present example, "birds.images.wikipedia.org" is an exemplary domain name. The DNS system 100 uses a DNS recursor 108 that will resolve this domain name and return the result to the communication device 102. The DNS recursor 108 uses authoritative domain name servers 130 for resolving this domain.

The DNS is a hierarchical naming system for computers, services, or any resource connected to the Internet or a private network. The DNS associates various information with domain names assigned to each of the participants. Most importantly, the DNS translates domain names into the numerical identifiers associated with networking equipment for the purpose of locating and addressing these devices worldwide. An often-used analogy to explain the DNS is that it serves as the "phone book" for the Internet by translating human-friendly computer hostnames into IP addresses.

The DNS distributes the responsibility of assigning domain names and mapping those names to IP addresses by designating authoritative domain name servers for each domain. Authoritative domain name servers are assigned to be responsible for their particular domains, and in turn can assign other authoritative name servers for their sub-domains. In general, the DNS also stores other types of information, such as the list of mail servers that accept email for a given Internet domain.

A domain name contains one or more parts, technically referred to as labels, which are conventionally concatenated, and delimited by dots, such as 'birds.images.wikipedia.org'. The right-most label conveys the top-level domain; for example, the domain name birds.images.wikipedia.org belongs to the top-level domain 'org'.

The hierarchy of domains descends from right to left; each label to the left specifies a subdivision, or subdomain of the domain to the right. For example: the label 'wikipedia' specifies a subdomain of the 'org' domain, and 'images' is a sub domain of 'wikipedia.org'.

A hostname is a domain name that has at least one IP address associated. For example, the domain names 'wikipedia.org' and 'images.wikipedia.org' are also hostnames, whereas the 'org' domain is not.

The DNS is maintained by a distributed database system. The nodes of this database system are the domain name servers. Each domain has at least one authoritative domain name server that publishes information about that domain and the name servers of any domains subordinate to it. The top of the hierarchy is served by root name servers 110, 112, which are the servers to query when looking up (resolving) a top-level domain name (TLD). When a domain name server is queried for a domain, it can return an "NS" entry, which is information about the next level name server that can service this request, or it can return an "A" entry, which is the final resolution to the domain in question.

In principle, authoritative domain name servers are sufficient for the operation of the Internet. However, with only authoritative domain name servers operating, every DNS query starts with recursive queries at the root zone of the DNS and performs a recursive operation down the levels of the domains to provide the hostname associated with the domain in question.

To improve efficiency, reduce DNS traffic across the Internet, and increase performance in end-user applications, the prior art DNS supports DNS caching by which caching DNS servers are responsible for querying the authoritative DNS servers, as well as storing the DNS query results for a period of time determined in the configuration (time-to-live) of the domain name record in question for use to answer future similar DNS requests they may receive. With this function implemented in the authoritative domain name server, user applications gain efficiency in design and operation.

The combination of DNS caching and recursive functions in a DNS recursor 108 is not mandatory, the functions can be implemented independently in servers for special purposes.

Internet service providers typically provide DNS recursors 108 with cache for their customers. In addition, many home networking routers implement DNS caches and recursors to improve efficiency in a local network.

The client-side of the DNS is referred to as a DNS resolver 106. The DNS resolver 106 is responsible for initiating and sequencing the queries that ultimately lead to a full resolution (translation) of the resource sought, e.g., translation of a domain name into an IP address.

A domain name resolver, such as a DNS recursor 108, determines the appropriate domain name servers responsible for the domain name in question by a sequence of queries starting with the right-most (top-level) domain label.

An example of such a sequence is provided below for the resolution of the domain name 'birds.images.wikipedia.org'. The process is started when a communication application 104 sends a request to the operating system 105 to translate a domain. The operating system 105 sends a request to the DNS resolver 106. The DNS resolver 106 may or may not have a local cache to store previous DNS results. If a valid result exists in such a cache, it is returned to the communications application, otherwise, the DNS resolver 106 queries an external DNS recursor 108. The external DNS recursor 108 is configured with the known addresses of the root name servers 110, 112. This is often stored in a file which is updated periodically by an administrator from a reliable source.

The external DNS recursor 108 queries one of the root name servers 110, 112 to find the next level authoritative domain name server authoritative for this domain. For example, the root name server 110, 112 may return the authoritative domain name servers responsible for the ".org" domain in the example in FIG. 1. The external DNS recursor 108 queries the obtained next level authoritative domain name server for the domain in question, and may either receive a final answer (IP for this domain) or an address of an authoritative domain name server authoritative for the next-level domain. The external DNS recursor 108 repeats the previous step until a final IP of the domain in question is returned.

When the external DNS recursor 108 has a caching system, the external DNS recursor 108 stores the requests it made to various authoritative domain name servers 130 (requests are the domain names to be resolved). The responses received (a response received includes the IP address of the host or the IP address of the authoritative domain name servers for a sub-domain of the requested domain, the validity (TTL) for the response, as well as other information for this request) are cached by the external DNS recursor 108.

Upon receiving a new request for a domain name resolution, the external DNS recursor 108 sends the requested domain to the root name server 110, 112, obtains a response that is either the host IP of the requested domain, or an authoritative domain name server 130 that can continue the process for a sub domain of the requested domain. If a name server IP address of a sub domain is returned, it is queried for the requested domain, and either returns the host IP address of the domain, or the IP address of the authoritative domain name server of a sub domain of the requested domain, and so forth until the host IP address is received. Each of these answers from the authoritative domain name servers is typically stored in the cache of the external DNS recursor 108.

In subsequent requests to the DNS system 100, the external DNS recursor 108 sends the request to its own local cache. If all requests are answered by the local cache, then a full resolution is made very quickly. If however, one or more of the entries in the list is expired or does not exist, then the external DNS recursor 108 queries the authoritative domain name servers 130 as described above, requiring a much longer resolution time.

Where in the past each Web page on the World Wide Web (WWW) typically had all of its content coming from one or two domains, the Web has evolved such that the content on each Web page now typically comes from multiple domains, and thus there are more domain name lookups per Web page. As an example, main content comes from the main domain, advertisements come from multiple ad servers, and widgets come from social networks. This makes the DNS resolution a constraining factor on page load times. Other network activities such as emails, etc., also rely on DNS. Thus, having a faster means of resolving domain names would benefit the speed of Internet based applications such as browsing and email.

The problem in the prior art DNS systems is that once an entry in the local cache has expired, the external DNS recursor must first resolve that entry again on the network to attempt to revalidate it, before continuing the DNS resolution. After revalidation, the process with the local cache continues. It is possible that then another cache entry that is required for the resolution will be expired, and again require a lengthy network lookup.

Another problem with the prior art DNS systems, is that they only query the DNS forwarder or DNS resolver that is available on one of its physical interfaces. With the prior art it is not possible to query all DNS forwarders and resolvers known to the host machine.

Yet another problem with the prior art DNS systems is as follows. For each level of hierarchy in the domain name system for which there is an authoritative domain name server, there is typically more than one such server. The DNS system knows about the multitude of servers, but only queries one server, and tries the other one if the initial query does not get answered. Again, this is a time consuming process.

Thus, a heretofore unaddressed need exists in the industry to address the aforementioned deficiencies and inadequacies.

SUMMARY OF THE INVENTION

Embodiments of the present invention provide a method and system for increasing speed of domain name system resolution within a computing device. Briefly described, in architecture, one embodiment of the system, among others, can be implemented as follows. A system for resolving domain name system (DNS) queries, contains a communication device for resolving DNS queries, wherein the communication device further comprising a memory and a processor that is configured by the memory, a cache storage for use by the communication device, and a network of authoritative domain name servers. In a process of the communication device looking up a DNS request within the cache storage, if the communication device views an expired DNS entry within the cache storage, the communication device continues the process of looking up the DNS request in its cache while, in parallel, sending out a concurrent DNS request to an authoritative domain name server that the expired DNS entry belongs to. If the resulting answer from the authoritative name server is the same as the expired cached DNS entry, then the result of the DNS cache process is used as the final DNS response. If it is not the same, then the normal process continues, using the new DNS entry received.

In accordance with a second exemplary embodiment of the invention, a system is provided for resolving domain name system (DNS) queries, wherein the system contains a communication device for resolving DNS queries, wherein the communication device further comprising a memory and a processor that is configured by the memory, a cache storage for use by the communication device, and a network of authoritative domain name servers. For each set of authoritative domain name servers within the network of authoritative domain name servers that exist for a DNS request, the communication device queries more than one authoritative domain name server in parallel and uses a first answer received from the set of authoritative domain name servers as a final answer to that DNS level request.

In accordance with a third exemplary embodiment of the invention, a system for resolving domain name system (DNS) queries is provided, wherein the system contains a communication device for resolving DNS queries, wherein the communication device further comprises a memory and a processor that is configured by the memory; a multitude of DNS recursors that are available to the computing device through a network; and a DNS resolver located within the communication device. The DNS resolver of the communication device contains a list of DNS recursors and when the DNS resolver needs to do a DNS lookup, the DNS resolver queries all or a portion of the multitude of DNS recursors concurrently and uses a DNS recursor that first answers.

It should be noted that the abovementioned three exemplary embodiments of the invention may instead be combined. Specifically, any combination of the three exemplary embodiments may be utilized.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
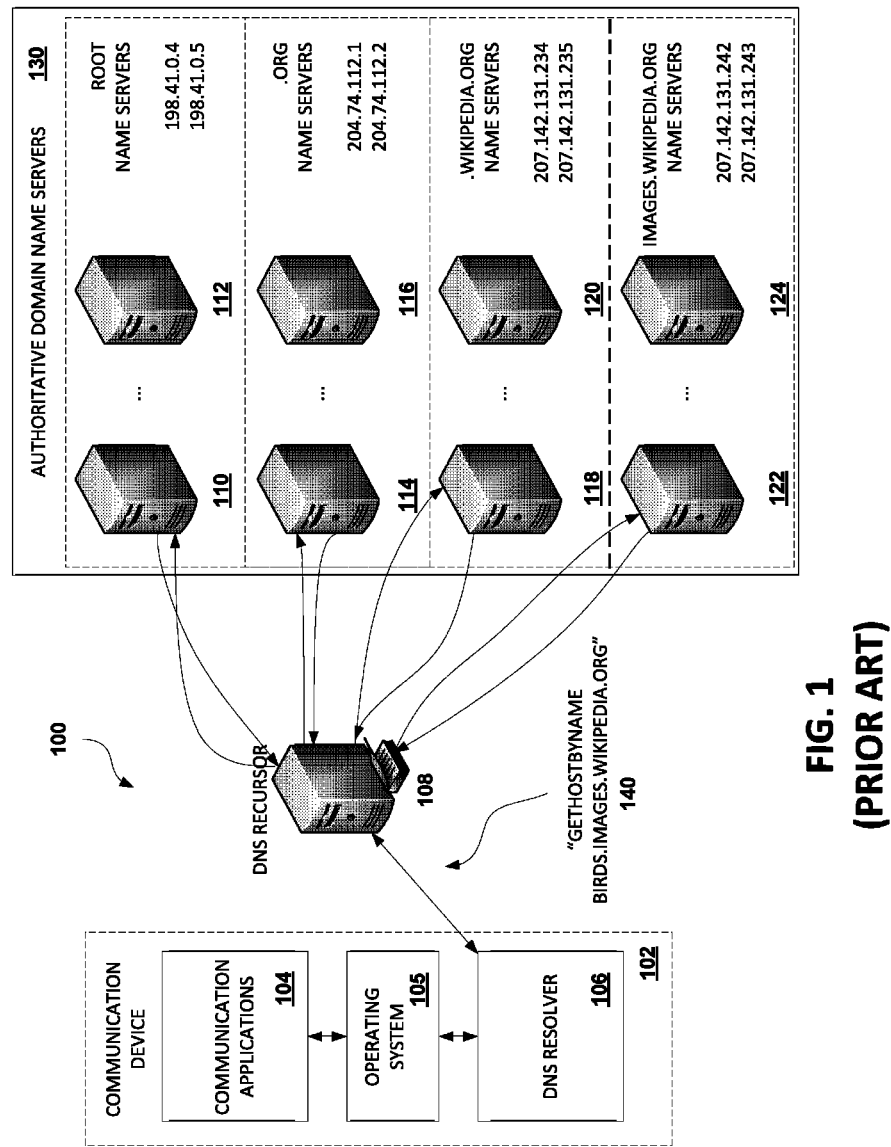
FIG. 1 is a schematic diagram illustrating a prior art DNS network/system configuration.

The present method and system provides for faster and more reliable domain name resolution. Briefly described, these benefits can be achieved by implementing the present methods as part of a new DNS client, or communication device, either within the client computing device as a main embodiment, or external to the device in other embodiments.

As previously described, a typical configuration of a computer will include the DNS forwarder (typically located, for example, in a home router) or a DNS resolver (typically located, for example, at the ISP of the user), or both. The DNS resolver in the client learns about these DNS forwarders and resolvers through the IP configuration of each of the interfaces of the client.

Where prior art DNS resolvers use only one of these forwarders/resolvers, the present method and system uses all forwarders and resolvers in the vicinity of the client and queries them concurrent to the other methods described. In the case where the answer from the forwarder or resolver is faster to arrive than in the other methods (for example in the case where the DNS query and answer are already cached in the forwarder or resolver), the answer from the forwarder or resolver gets used. This speeds up the time of resolution for the DNS request.

As was also previously described with regard to the prior art, a typical caching DNS recursor uses its cache to resolve the DNS request without sending out network requests, if this is possible. The DNS recursor does this by querying its own cache with the same queries it would have sent to the authoritative name servers, starting with the root server, and continuing to 'deeper' levels (i.e., lower in the DNS label hierarchy—e.g., querying the root server for the '.com' authoritative domain server first, and then querying that server for the 'wikipedia.com' authoritative domain server, etc.) until getting to a resolution. In some cases, a resolution cannot be made from the cache only, because of entries that either do not exist, or exist and are already expired. In the case where the entry found in the cache for this request is expired, a typical DNS server then queries the relevant external authoritative domain name server before continuing the cache search and possibly running into another expired cache entry that would require another lengthy network request. Many times, after resolving the expired cache entry via an external request to the authoritative name server, the IP address that is received from that name server is the same IP address that previously existed in the cache database of the DNS resolver, meaning that the final result is the result that existed in the cache of the caching DNS recursor. If the two or more expired cache entries were to be re-validated through the network concurrently to a cache search, that result would have been used, thus saving time.

In accordance with the present method and system, and a first exemplary embodiment of the invention, in order to avoid wasting time when cache entries are expired, the present method and system performs two steps concurrently. First, the present method and system continues operation as if the expired cache entry is still valid and thus continues resolving the DNS request from the cache. In parallel, the present system and method queries the authoritative domain name server that provided the expired answer in the past for obtaining the latest valid entry for this URL. If, following the comparison of the cache entry to the one now received from the authoritative domain name server, the entry in the cache is still valid, the present method and system uses the final answer received from the first process herein. Acting on the assumption that the invalid cache entry was still valid is productive for the process.

If the IP address received from the authoritative domain name server is not the same as the expired entry in the cache, the present method and system ignores the result received from the first step and continues normally with the result received from the authoritative domain name server. This modification in the operation of the DNS recursor saves time, since in most cases of an expiration of a cached record, the record is still valid, and thus the serial recursive process would have been slower than the concurrent process of the present method and system. In other cases (i.e., in the cases where the assumption that the expired cache entry was still valid, but following the query to the authoritative domain name server it turned out not to be valid), the time the present method and system takes is the same as the prior art process, meaning that if the cache entry was indeed invalid, then doing the two steps in parallel as described above did not waste time—the end result is returned in the same time it would have taken a 'normal' DNS process to return a valid answer.

As also previously described regarding the prior art, there are several authoritative domain name servers that serve the same level (e.g., there are multiple root servers and there are multiple servers handling the '.org' TLD). When an external DNS recursor needs to query for a certain level, the recursor will choose one of the authoritative domain name servers available for that level, and use its response. If the authoritative domain name server does not respond, then the DNS client will query a different authoritative domain name server within that level, thus taking longer to respond.

Alternatively, in accordance with the present invention, and a second exemplary embodiment of the invention, the DNS client (i.e., communication device) queries all authoritative domain name servers known to it at the same level concurrently. The DNS client uses the first response received from one of these authoritative domain name servers that were queried, as its final response. On average, this will minimize the time required to receive a response, since more servers are queried in parallel and thus the time it takes to receive a response is the minimum of all possibilities available to a regular DNS resolver.

As described in additional detail herein, the present DNS recursor uses all of the above methods (and combinations thereof) concurrently, whether located within the requesting communication device, or within another communication device, to be used by multiple communication devices.

The method and system of the present invention is provided in a DNS system similar to the DNS system of FIG. 1, except that the communication device and/or DNS recursor(s) is different, as described herein. In accordance with the present invention, within the DNS system 150 illustrated by FIG. 2, a communication device 202 that requires translation of a domain name ("birds.images.wikipedia.org" in this example) uses an external DNS recursor 258 that will resolve the domain name and return the result to the communication device 202. The external DNS recursor 258 uses authoritative domain name servers 240 for resolving this domain.

Figure 2:
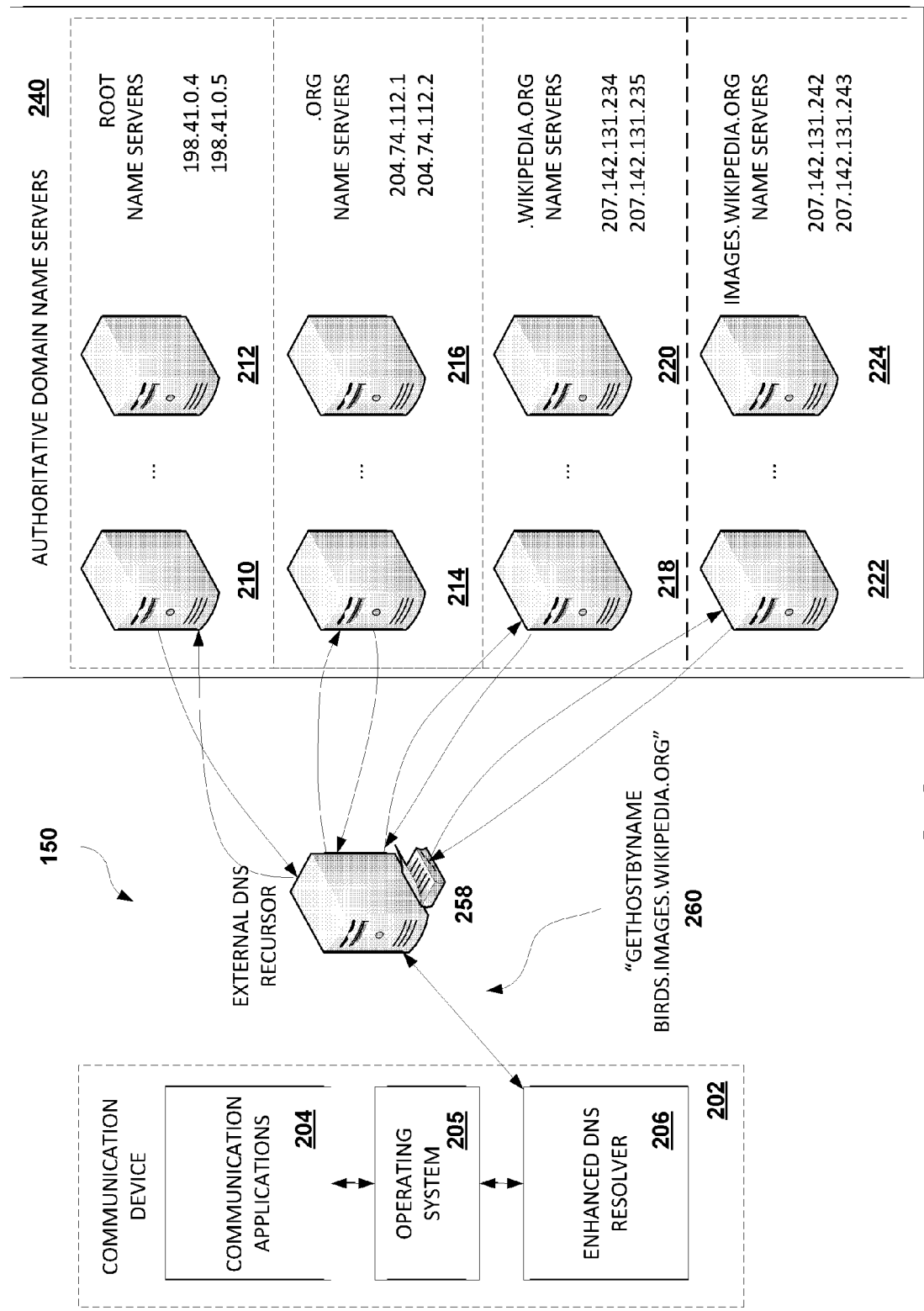
FIG. 2 is a schematic diagram illustrating a DNS network/system in accordance with the present invention.

Functionality of the present invention is provided by an enhanced DNS resolver 206 that is located within the client communication device 202. Such functionality may, also or instead, be in the various types of external DNS recursors 258, as shown by FIG. 2.

When a communication application 204 requires the resolution of a domain into an IP address, or other services that the DNS system 150 may provide, it sends the query to an operating system 205, which passes it on to the enhanced DNS resolver 206.

Figure 3:
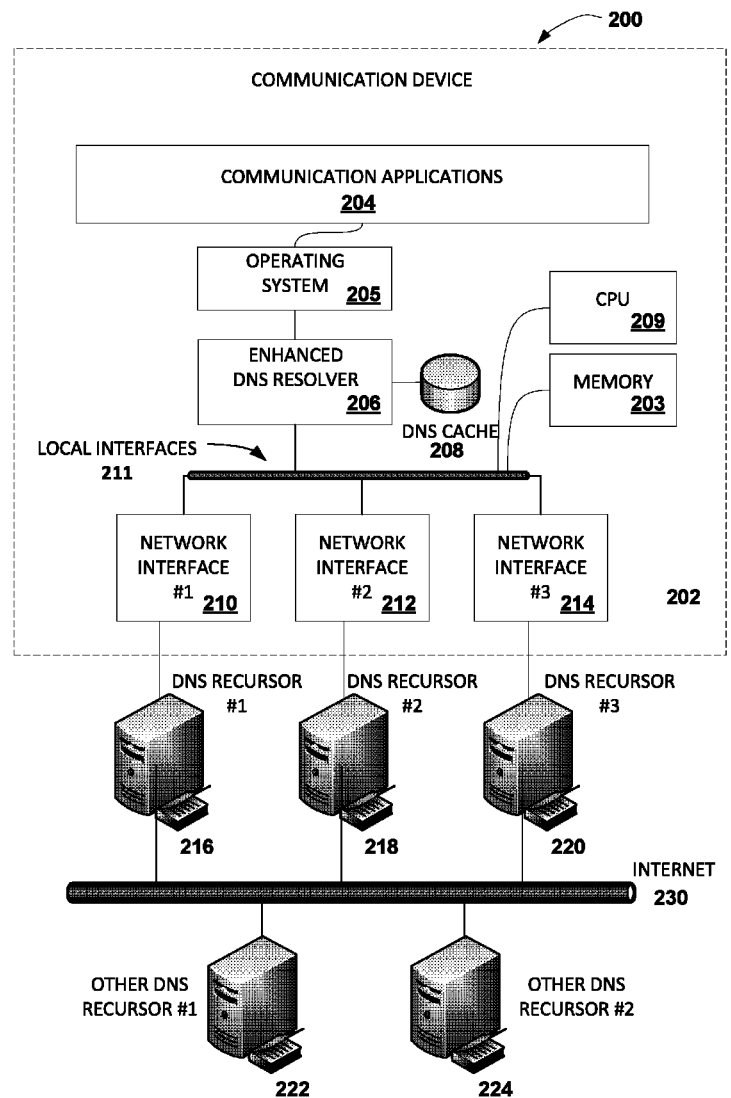
FIG. 3 is a schematic diagram of a system containing a communication device and the external DNS recursors with which the communication device may communicate.

FIG. 3 is a schematic diagram of a system 200 containing a communication device 202 and external DNS recursors 216, 218, 220, 222, 224 with which the communication device 202 may communicate. As shown by FIG. 3, the communication device 202 contains a memory 203. The memory 203 contains the enhanced DNS resolver 206, an operating system 205, a DNS cache 208, and communication applications 204. The communication applications 204 are applications that would need to make use of a DNS system, for example, to communicate with other applications on the network.

The communication device 202 may also contain a processor 209. The processor 209 is a hardware device for executing software, particularly that stored in the memory 203, such as, but not limited to, the communication applications 204 and the enhanced DNS resolver 206. The processor 209 can be any custom made or commercially available processor, a central processing unit (CPU), an auxiliary processor among several processors associated with the communication device 202, a semiconductor based microprocessor (in the form of a microchip or chip set), a macroprocessor, or generally any device for executing software instructions.

The memory 203 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 203 may incorporate electronic, magnetic, optical, and/or other types of storage media. Note that the memory 203 can have a distributed architecture, where various components are situated remote from one another, but can be accessed by the processor 209.

The operating system 205 essentially controls the execution of programs within the communication device 202 and provides scheduling, input-output control, file and data management, memory management, and communication control and related services.

In accordance with the exemplary system 200 illustrated by FIG. 3, some of the external DNS recursors 216, 218, 220 are located on the same network as the communication device 202, and some of the external DNS recursors 222, 224 are reachable through the Internet 230. The communication device 202 contains several network interfaces 210, 212, 214 for connecting to the network. For example, one of the network interfaces 210, 212, 214 could be a physical Ethernet connection, another could be a WiFi connection, and another could be a cellular Internet connection. Present-day DNS resolvers typically query the network interfaces in use, and choose a DNS recursor that is connected to one of these interfaces. In other cases, the DNS recursor to use is configured so that the recursor to be used is one located further away from the communication device, on the Internet, such as 222 and 224. Examples of such DNS servers that are located further away are OpenDNS (www.opendns.com), and Google's DNS (8.8.8.8).

The memory 203, processor 209, and network interfaces 210, 212, 214 are communicatively coupled via a local interface 211. The local interface 211 can be, for example but not limited to, one or more buses or other wired or wireless connections, as is known in the art. The local interface 211 may have additional elements, which are omitted for simplicity, such as controllers, buffers (caches), drivers, repeaters, and receivers, to enable communications. Further, the local interface 211 may include address, control, and/or data connections to enable appropriate communications among the aforementioned components.

Figure 4:
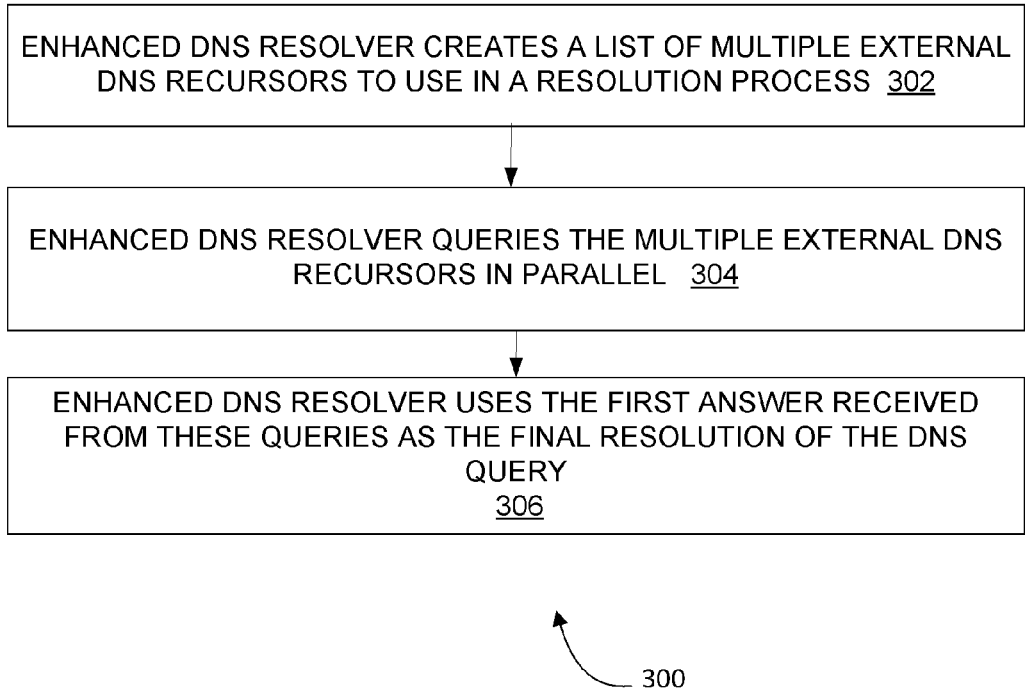
FIG. 4 is a flowchart illustrating how the DNS client chooses the recursor.

FIG. 4 is a flow chart 300 illustrating general steps taken by the present method and system to increase speed of DNS resolution within the client communication device 202, in accordance with a third exemplary embodiment of the invention. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Referring to FIG. 4, the enhanced DNS resolver 206 creates a list of multiple external DNS recursors to use in a resolution process (block 302). This list is comprised of the external DNS recursors available to the system on the client communication device 202, and/or on the local area network, and/or anywhere on the network (as configured by the administrator). The enhanced DNS resolver 206 then queries these multiple external DNS recursors in parallel (block 304), using the first answer received from these queries as the final resolution of the DNS query (block 306). The answer is the final answer for the DNS request. For example, if the full DNS request was to resolve images.wiki.org, the request for images.wiki.org is sent out to all these recursors, and the first recursor to reply with the fully resolved IP for this URL is recursor used.

It should be noted that, as is described in further detail hereinbelow, to speed up the DNS process, the external DNS recursor can query a multitude of the same level authoritative domain name servers concurrently and use the first answer received from the servers (e.g., can query the root authoritative domain name servers 110 and 112 in FIG. 1, and use the first answer received).

Creating a List of Multiple DNS Recursors to Use in a Resolution Process

Figure 5:
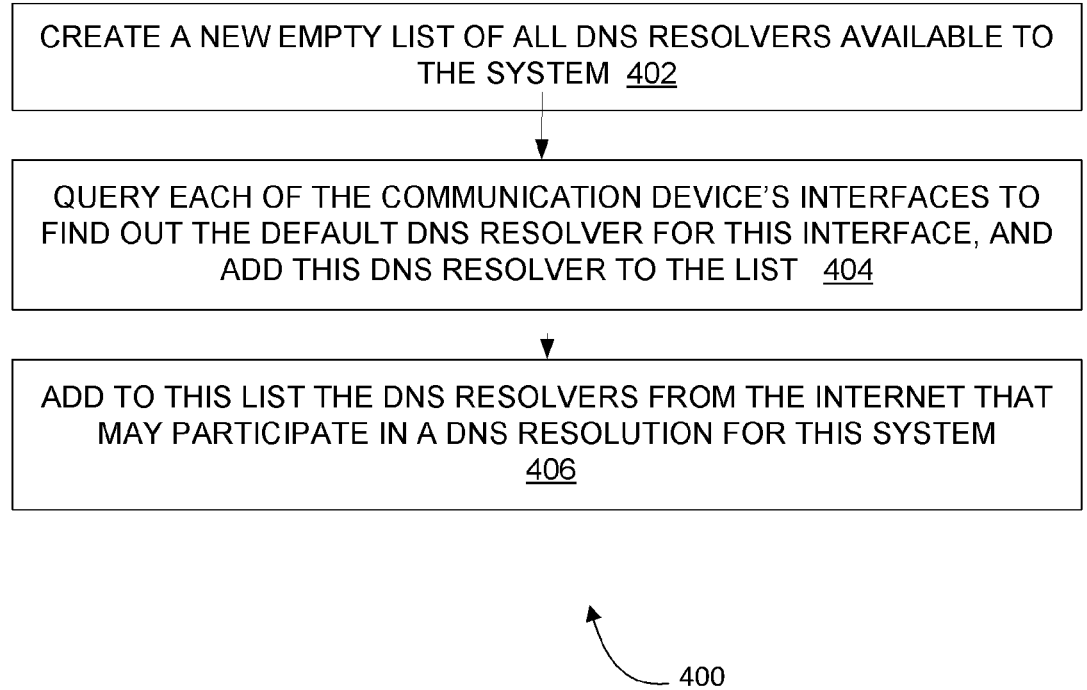
FIG. 5 is a flowchart illustrating a method of finding out all of the external DNS recursors that can be used.

FIG. 5 is a flow chart 400 illustrating how in the present invention the enhanced DNS resolver 206 creates a list of multiple external DNS recursors for it to use in the DNS resolution process. In the present invention several DNS recursors are assigned using the following method. As shown by block 402, a new DNS recursor list is created. Specifically, room is allocated in the memory of the computer.

As shown by block 404, the enhanced DNS resolver 206 queries all of the network interfaces 210, 212, 214 to find all of the external DNS recursors 216, 218, 220 that are connected to the local network of the communication device 202. The enhanced DNS resolver 206 adds these DNS recursors 210, 212, 214 to the list. As shown by block 406, the enhanced DNS resolver 206 adds to this list other known DNS recursors 222, 224 found on the Internet that it will use. This list of other known DNS recursors 222, 224 is part of the configuration of the enhanced DNS resolver 206, and may be changed by the user or the vendor of the enhanced DNS resolver, 206 from time to time.

Querying Multiple DNS Recursors in Parallel

Figure 6:
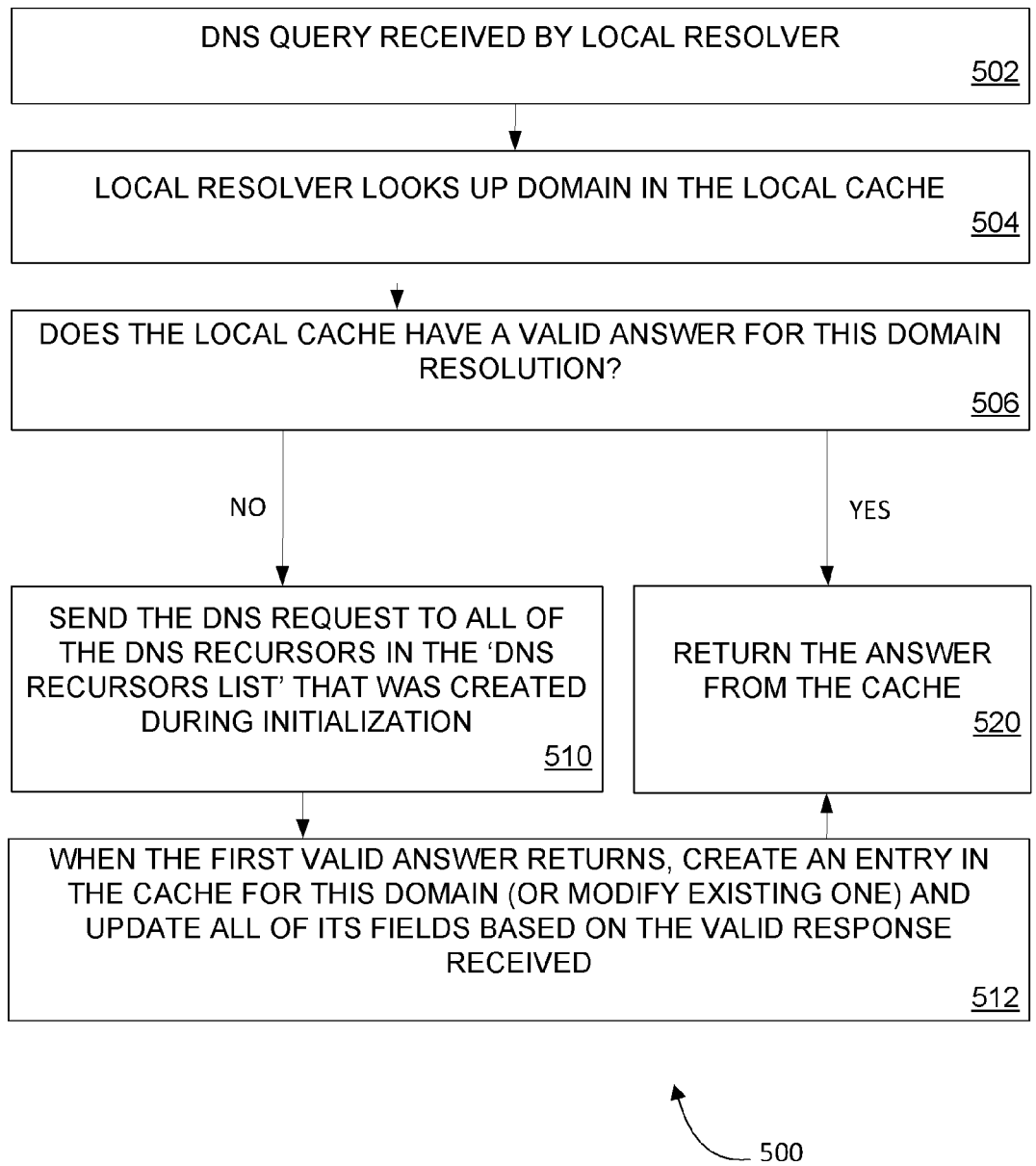
FIG. 6 is a flowchart illustrating the use of all recursors in the list for DNS resolution.

FIG. 6 is a flow chart illustrating operation of the enhanced DNS resolver 206 for querying the DNS recursors 216, 218, 220, 222, 224 for the domain name translation, in accordance with a third exemplary embodiment of the invention. As shown by block 502, the operating system 205 receives a domain name to resolve from a networking application. As shown by block 504, the enhanced DNS resolver 206 looks up the domain in its DNS cache 208 if such a cache exists.

If the domain exists in the cache, and is still valid, the resolution of this domain is returned from the DNS cache 208 (block 520) and the process is complete. If however, the domain does not exist in the DNS cache 208, or is no longer valid, then, as shown by block 510, the enhanced DNS resolver 206 queries all or a portion of the DNS recursors 216, 218, 220, 222, 224 that are found in the DNS recursors list, and waits for the first valid response to be returned from these DNS recursors 216, 218, 220, 222, 224. As shown by block 512, when the first such valid response is received, the enhanced DNS resolver adds this DNS query and response to the DNS cache 208 (or modifies an existing entry), and returns the answer received to the requesting application 204 (block 520).

This process of using multiple DNS recursors reduces the time of response on average, since the response time from several DNS recursors varies, this process queries multiple sources and uses the minimum response time of all DNS recursors used.

Querying Multiple Name Servers in the Same Level Concurrently

In accordance with the present invention, either the enhanced DNS resolver 206, or the DNS recursor 216, 218, 220, 222, 224 will query all known authoritative domain name servers for each level in parallel by sending out the same request (the domain name to be resolved), and waiting for the first answer received.

Use of this method shortens the average response time per domain level, since the various authoritative domain name servers will have varying response times, and the new enhanced DNS resolver 206, or the DNS recursor 216, 218, 220, 222, 224 will use the shortest of these times.

Faster DNS by Querying the Network in Parallel to the Cache for Expired Entries

Figure 7:
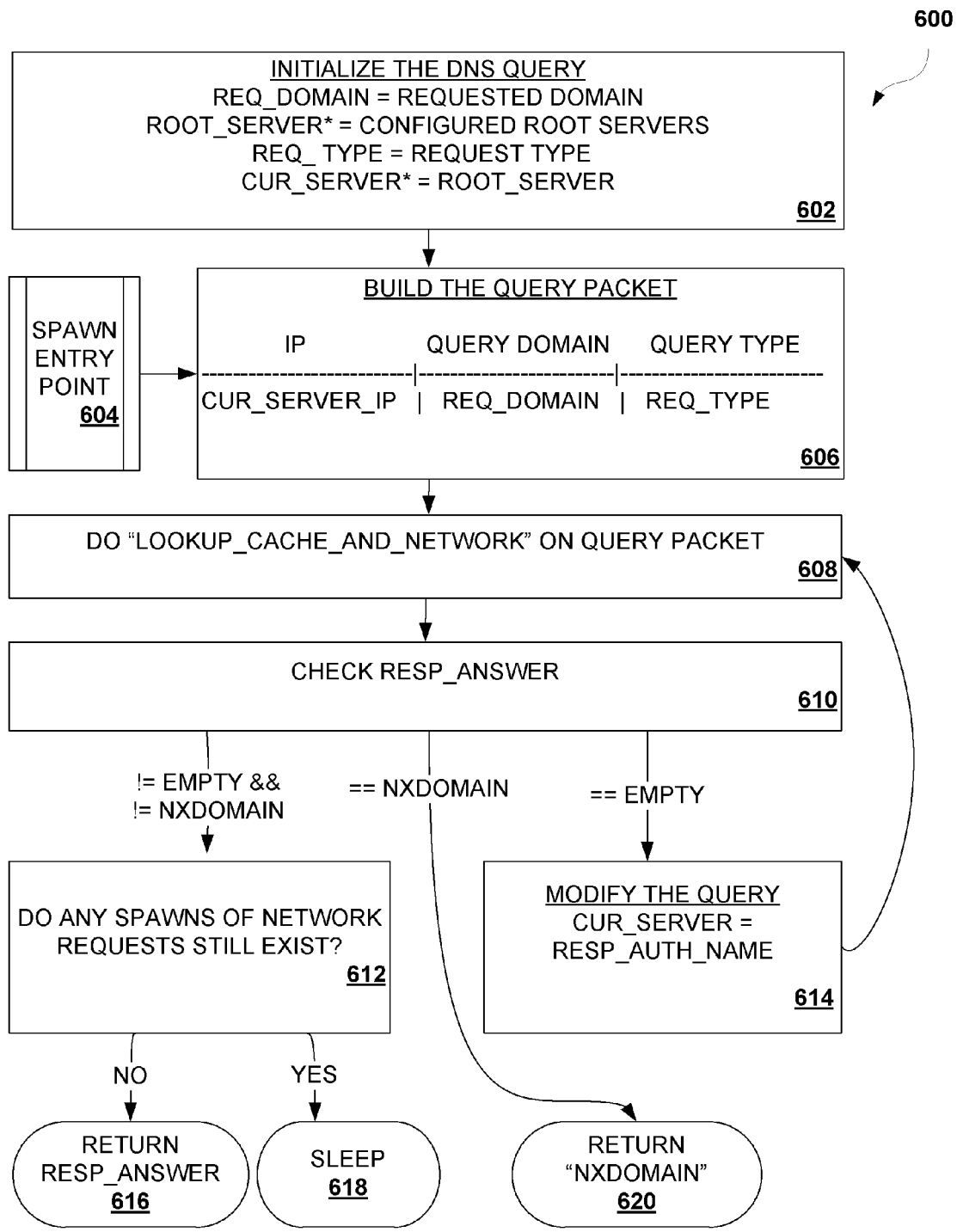
FIG. 7 is a flowchart illustrating the new method of concurrently querying the DNS network and the local cache.

Operation of the present method and system begins when the communication application 204 sends a request for a domain name resolution to the operating system. FIG. 7 is a flow chart 600 illustrating the main operation of the DNS system 150, in accordance with the first exemplary embodiment of the invention. As shown by block 602, a DNS request sent to the present system 150 is received, and the system 150 is initialized. The requested domain (REQ_DOMAIN) is set to the domain requested of the DNS system 150. The root server parameter (ROOT_SERVER) is set to the list of root servers of the DNS system on the Internet. As is known by those having ordinary skill in the art, the DNS system is comprised of root servers which are the highest hierarchy servers (that store information about who are the authoritative name servers for the .com, .net, .org, etc. domains. The list of root servers of the DNS system are configured within the computer that is doing the DNS resolution (either the communication device such as 202 or the recursor such as 258 depending on where the resolution is taking place, in a configuration file, or other known methods). REQ_TYPE is the type of answer that is expected (e.g., "A" for a host name, "NS" for a name server, etc.) for the resolution by the system 150, and the CUR_SERVER variable is set to the ROOT_SERVER.

It should be noted that there are multiple authoritative domain name servers that are authoritative for each level in the domain hierarchy. For instance, there are multiple authoritative domain name servers handling the "Root" hierarchy, and multiple servers handling the ".com" hierarchy. For simplicity, the following describes the simple case of one authoritative domain name server per hierarchy.

As shown by block 606, the system, which may be the communication device 102 or the external DNS recursor 108, depending on where the resolution is taking place, puts together the query packet that will be sent to the DNS cache 208 and possibly to elements in the DNS system for resolution. The query packet is built in the same format as existing DNS packets are built in the pre-existing DNS network. The format of the packet for making a DNS query is built exactly as defined in the DNS protocol.

Figure 8:
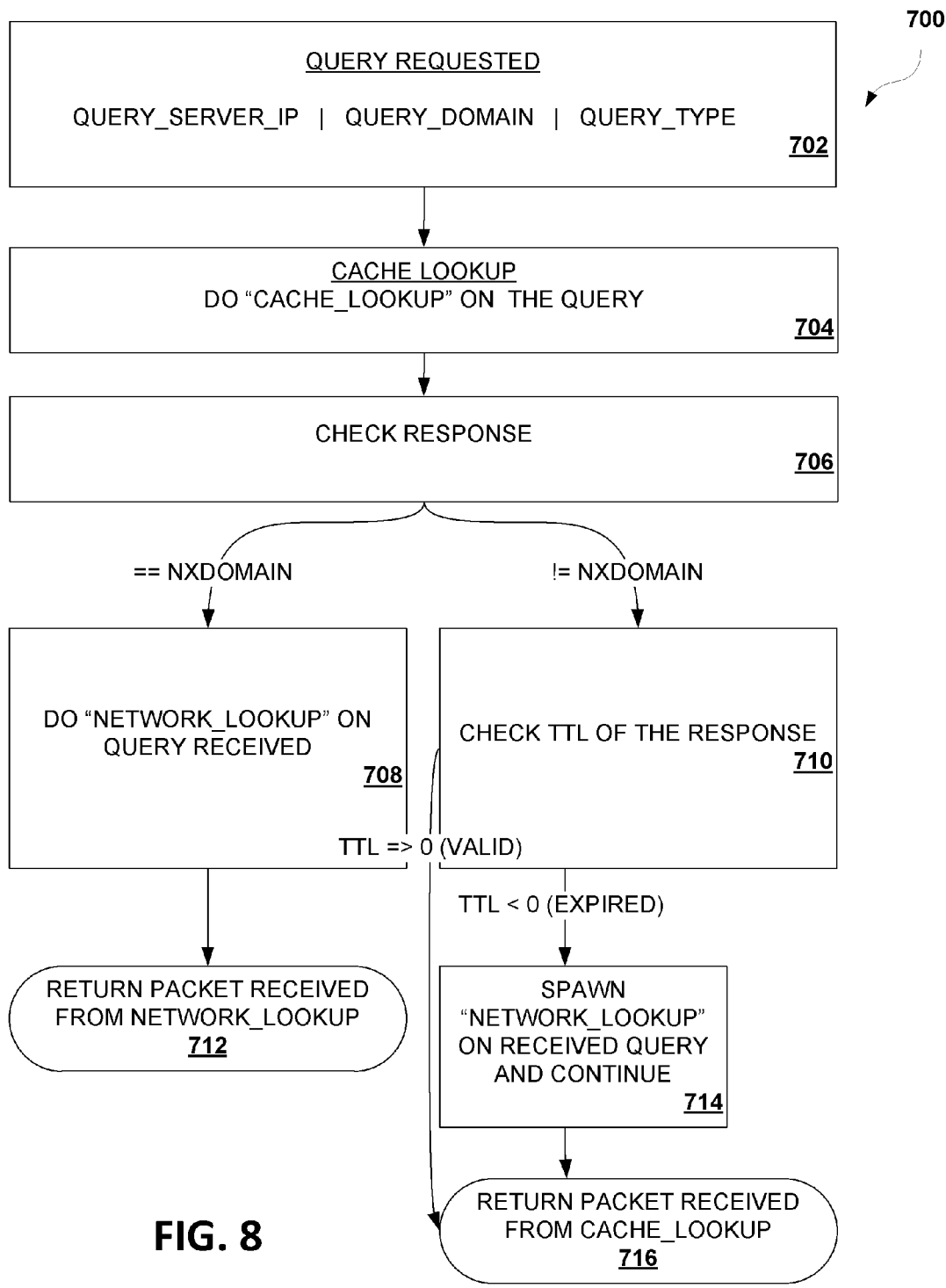
FIG. 8 is a flowchart illustrating the sub-system called 'cache and network lookup' of the system in FIG. 7.

As shown by block 608, the query packet that was constructed is sent to the DNS cache 208 and to the external DNS network of authoritative name servers by calling the LOOKUP_CACHE_AND_NETWORK process that is detailed in FIG. 8. During the LOOKUP_CACHE_AND_NETWORK phase, the query packet is sent to the DNS cache for resolution, and in some cases also to the network, such that a response is received. As shown by block 610, the response received has an "Answer" field, which may contain one of three options:

1. "NXDOMAIN", which means that the DNS system determined that there is no authoritative domain name server that knows of a domain by the name that was requested. In such a case, "NXDOMAIN" is returned to the caller of the system (block 620), thereby telling the caller that such a domain does not exist.

2. "EMPTY", which means that an answer was received, but the answer is not of the type that the user was looking for (for example, the user was looking for an "A" record, which means that the user was looking for the IP of a specific host, and the DNS server that was queried returned a name of an authoritative domain name server that can help to further break down or resolve the request). In such a case, the CUR_SERVER_IP variable, which is the name of the server currently being queried for the requested domain, is modified to be the name of the authoritative domain name server (RESP_AUTH_NAME) returned by the current response. This typically is the authoritative domain name server that is hierarchically lower than the authoritative domain name server queried. The system then returns to block 608 to lookup the requested domain in the DNS cache 208 and network. It should be noted that the authoritative name server to query, what to ask it, etc., is all defined by the query packet that was built in block 606 (send the request to the server who's IP is CUR_SERVER_IP, ask it about the domain defined in the REA_DOMAIN part of the packet, and ask for an answer of the type defined by REQ_TYPE). It should be noted that the IP address of the RESP_AUTH_NAME is not always provided—the "Auth" field in DNS responses holds the name of the authoritative domain name server to be queried but not its IP address. The IP address is provided in the "AR" field. However, it is valid in DNS protocol to not have the IP of the server provided in the AR field. In such a case, a separate DNS lookup will need to be done on the authoritative domain name server that is returned in the "Auth" field.
3. Not "NXDOMAIN" and not "EMPTY", which means that a resolution was received. In such a case the enhanced DNS resolver 206 or external DNS recursor 258 is ready to return this answer received back to the caller of the DNS system 150. However, as shown by block 612, the system 206, 258 first checks on whether there are any outstanding calls to the DNS network, and waits to get the calls back before returning. If there are such outstanding requests then, as shown by block 618, the DNS system 150 sleeps to wait for these calls. If there are no such outstanding requests, as shown by block 616, the system responds to its caller with the answer to the DNS request.

FIG. 8 is a flowchart 700 expanding on the process of "LOOKUP_CACHE_AND_NETWORK" from block 608. As shown by block 702, the DNS query is received. There are three parameters in the received DNS query that are most relevant to this process: the QUERY_SERVER_IP, which is the authoritative domain name server to be queried at this stage of the process; the QUERY_DOMAIN, which is the domain that this whole DNS process is looking to resolve (received by this DNS system form the external caller); and the QUERY_TYPE, which is the type of response that this DNS request is expected to return.

Figure 9:
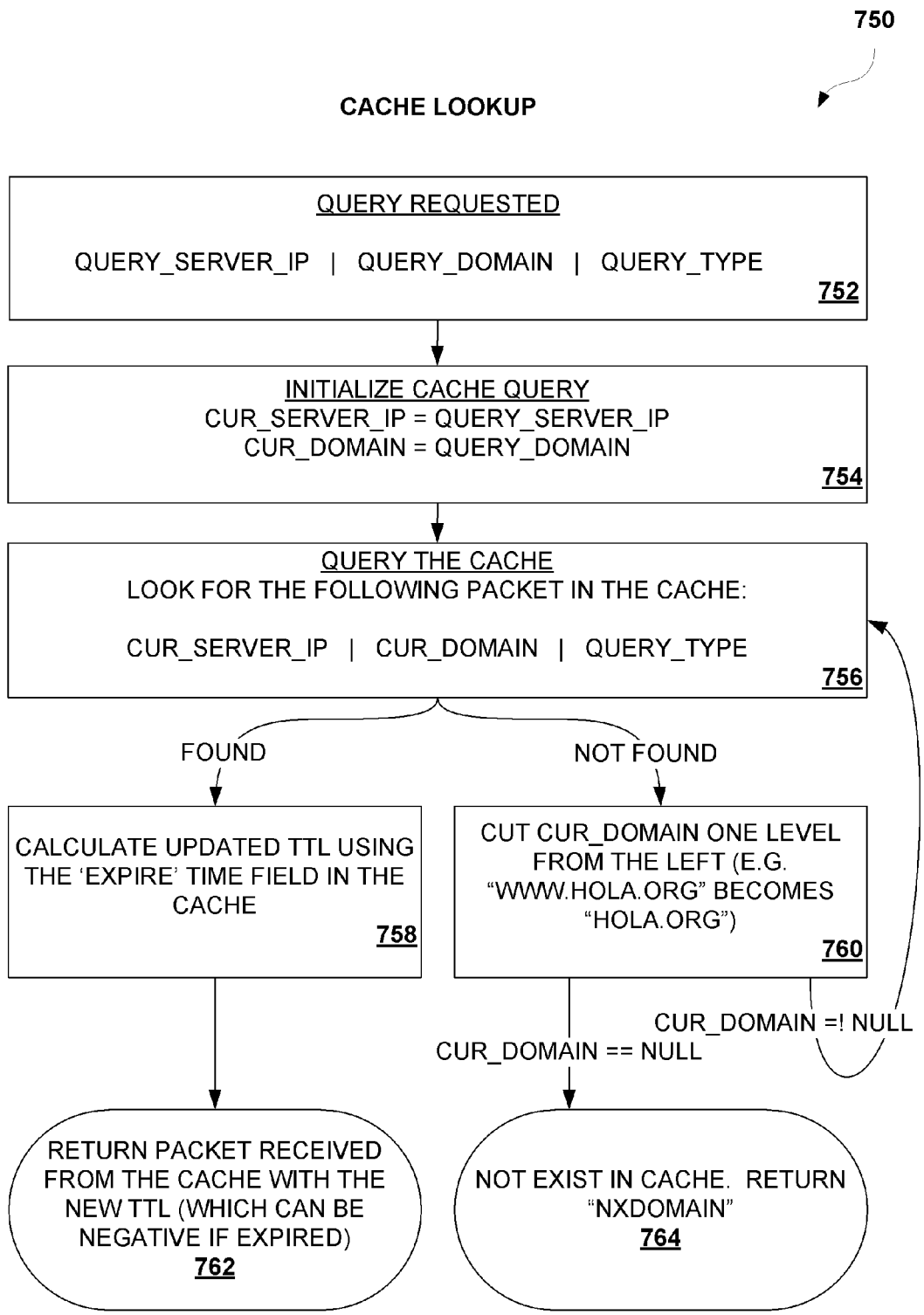
FIG. 9 is a flowchart illustrating the sub system called 'cache lookup' of the system in FIG. 7.

As shown by block 704, a DNS cache lookup is performed by calling the CACHE_LOOKUP process that is detailed in FIG. 9, by sending the CACHE_LOOKUP process the QUERY_SERVER_IP, the QUERY_DOMAIN and the QUERY_TYPE as the keys to the cache lookup. A response is then checked (block 706). The response packet from the DNS cache 208, which is similar to a DNS response packet, has an "Answer" field, which may contain one of two options:

1. "NXDOMAIN", which means that the cache did not find an entry that meets the criteria. In such a case, as shown by block 708, the function NETWORK_LOOKUP is called (FIG. 10) with the parameters received in 702, and then in 712 the answer from that function is then sent back to the caller of the "CACHE_AND_NETWORK_LOOKUP" function.

Not "NXDOMAIN", which means that a cache entry was found. In such a case, as shown by block 710, the DNS system 150 determines whether the cached entry has expired or not, by checking its "TTL" (time to live") entry that is derived from the DNS cache by calculating the difference in the time of validity stored in the DNS cache relative to the current time (the entry is said to be valid if the time stored in the "Valid" field of the DNS cache is in the future). If the cached entry is still valid, then the valid packet received from the DNS cache is returned to the caller of this process, as shown by block 716. However, if the cached entry is not valid (i.e., is expired), then, as shown by block 714, a separate process is spawned, and the NETWORK_LOOKUP process is called from the new process. In parallel to this process, as shown by block 716 the expired packet received from the cache is returned for further processing.

It should be noted that in the present DNS system, cached entries are not removed from the cache, since they are used to assist prediction of the DNS resolution path.

FIG. 9 is a flowchart 750 detailing the CACHE_LOOKUP process from block 704. Referring to FIG. 9, as shown by block 752, the DNS query is received by the CACHE_LOOKUP process. There are three parameters in the received DNS query that are most relevant to this process: the QUERY_SERVER_IP, which is the authoritative domain name server to be queried at this stage of the process, the QUERY_DOMAIN, which is the domain that this whole DNS process is looking to resolve (received by this DNS system form the external caller), and the QUERY_TYPE which is the type of response that this DNS request is expected to return.

As shown by block 754, the query to the DNS cache is initialized by starting the CUR_SERVER_IP variable with the QUERY_SERVER_IP received in block 752, and initializes the CUR_DOMAIN variable with the QUERY_DOMAIN that is to be searched for. As shown by block 756, the cache lookup is performed, where the CUR_SERVER_IP, CUR_DOMAIN and QUERY_TYPE are used as the key in the search.

If the key matches an entry in the DNS cache, then the TTL is calculated (block 758) by calculating the time left from the current time until the time in the "VALID" field of the entry found in the DNS cache. It should be noted that unlike prior art DNS systems, the present DNS system continues to store expired entries, and thus a negative TTL time may be received in this calculation. As shown by block 762, this packet that is received as the answer to the cache request is returned to the caller of the CACHE_LOOKUP process.

If the key does not match an entry in the DNS cache, as shown by block 760, the CUR_DOMAIN is cut one level from the left. As an example, if CUR_DOMAIN is "www.hola.org", then after block 760 the resulting CUR_DOMAIN is now "hola.org". If the resulting CUR_DOMAIN is now NULL (i.e., it was just a top level domain before, like ".com", and now that has been 'cut'), then as shown by block 764 "NXDOMAIN" is returned to the caller, meaning that a cache entry that is relevant to this domain does not exist. However, if the CUR_DOMAIN is not NULL, then the dns resolution system, that is residing in the resolver or the recursor goes back to block 756 to look for a cache entry with a key that matches the new CUR_DOMAIN, the CUR_SERVER_IP and the QUERY_TYPE.

Figure 10:
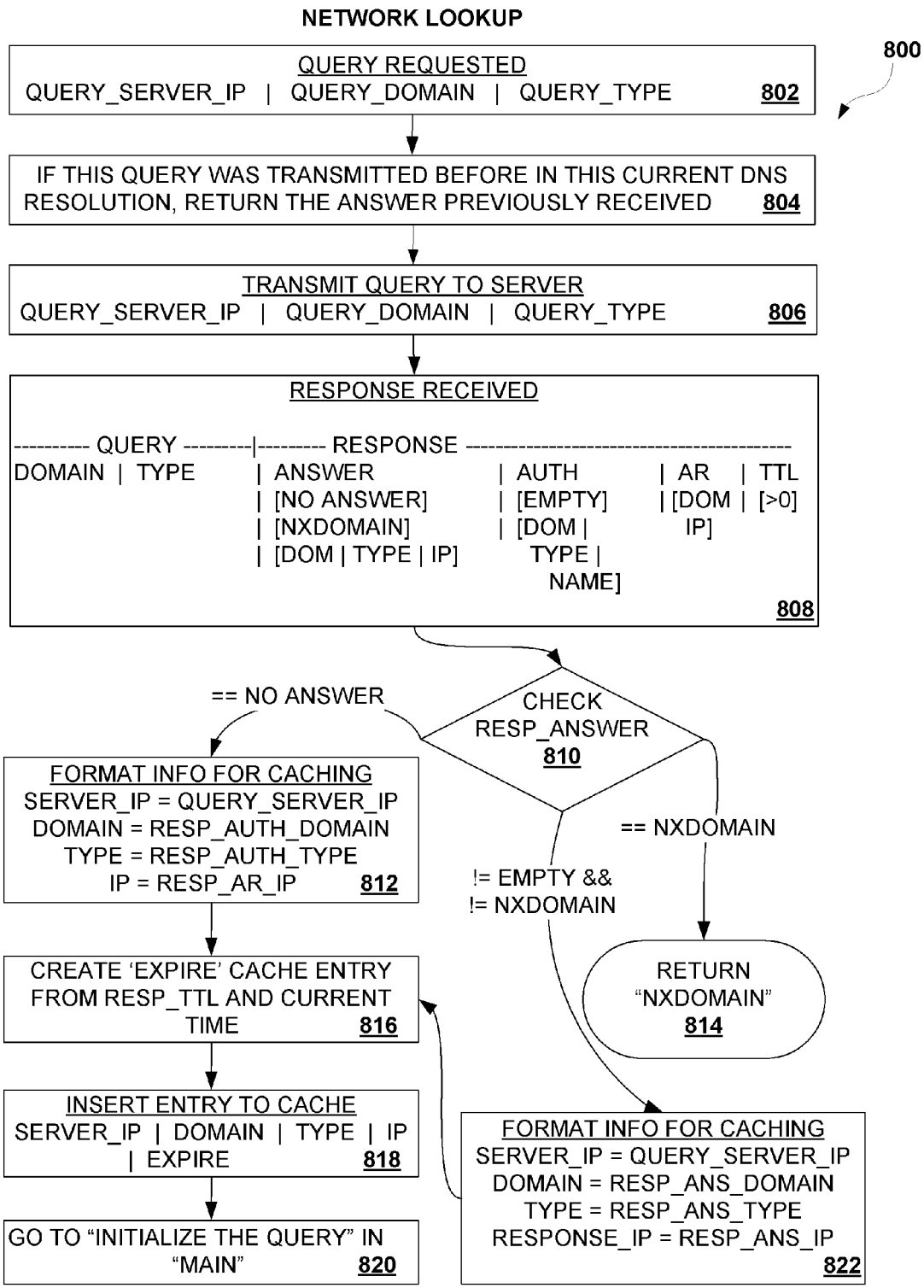
FIG. 10 is a flowchart illustrating the sub system called 'network lookup' of the system in FIG. 7.

FIG. 10 is a flowchart 800 detailing the NETWORK_LOOKUP process from block 708. As shown by block 802, the DNS query is received. There are three parameters in the received query that are most relevant to this process: the QUERY_SERVER_IP, which is the authoritative domain name server to be queried at this stage of the process, the QUERY_DOMAIN, which is the domain that this whole DNS process is looking to resolve (received by this DNS system form the external caller), and the QUERY_TYPE which is the type of response that this DNS request is expected to return.

As shown by block 804 it is tested whether an identical DNS query has already been sent out to the DNS network, and if so, returns the answer that was previously received for the previous such search that was executed. This is done mostly to eliminate un-needed network traffic.

As shown by block 806, the DNS query is built as a standard DNS packet, and transmitted to the authoritative domain name server identified by QUERY_SERVER_IP. Block 808 shows the format of the DNS packet as it is received back from the authoritative domain name server.

The DNS packet received has two parts: the QUERY, which is the question that was asked of the authoritative domain name server; and the RESPONSE, which is the part where the answers are provided. The ANSWER part of the response will include one of three answers:
1. Domain, Type and IP: which is the answer to the question that was asked. For example, if the DNS lookup was for images.hola.org of type 'A' (meaning that the query is for the IP of the host images.hola.org), then the ANSWER can be "images.hola.org 10.71.1.1 A".
2. NXDOMAIN: which means that the authoritative domain name server replied that there is no such domain under its authority
3. NO ANSWER: which means that this authoritative domain name server does not have authority over the requested domain, but knows of the next-level authoritative domain name server that can provide additional information (or the final answer) for this domain resolution. The additional information will be in the AUTH field of the RESPONSE.

The AUTH field may either be empty, or contain the additional information for the domain resolution in question. In case the authoritative domain name server wanted to provide back a name server that may provide additional information about the domain in question, the ANSWER field will be empty, and the AUTH filed will include the name of the entity it points to (e.g. the domain name of an authoritative domain name server), the type of the entity (e.g., "NS"), and the domain hierarchy for which this entity has authorization for (e.g., ".org"). Note that the IP of the name of the entity that it points to may be included in the AR field. If it is not included in the response, then a DNS lookup on this name needs to be performed before continuing the DNS resolution process.

The TTL field of the response is the time left for this information to be accurate (it is always greater than zero). After this time passes, the information provided by this response is no longer valid. This is very useful for caching systems, as it provides information on how long this may be cached and used. It should also be noted that the response may have multiple domains in the AUTH and AR fields. In this explanation, for simplicity, it is assumed that one answer is returned, since handling multiple answers is trivial based on the explanations in the present description.

As shown by block 810, the ANSWER field of the received response is evaluated. If the response is NXDOMAIN (i.e., such a domain does not exist), then an NXDOMAIN is returned back to the caller of the NETWORK_LOOKUP function.

If the response is NO_ANSWER (i.e., it is a referral to a sub domain DNS server), as shown by block 812, the returned information is prepared to be cached, where the SERVER_IP is the IP of the authoritative domain name server that returned this answer, the IP is the IP of the next level authoritative domain name server that is pointed to by this answer, DOMAIN is the DOMAIN received in the AUTH field for which this particular authoritative domain name server has authority for, and type is the type of this authoritative domain name server.

As shown by block 816 the TTL entry is formatted for the caching, by turning it into an absolute time for the DNS system to work with. So for example if the current date/time is now Nov. 11, 2010 4:36:00 am and the TTL returned in the RESPONSE|TTL section of the packet is 2 min, then the TTL is set to 4:38:00.

As shown by block 818, the entry is inserted into the cache and the flow returns to the INITIALIZE_THE_QUERY in MAIN, so that with this addition to the DNS cache, the domain can again try to be resolved directly from the DNS cache. The key of the DNS cache is the combination of three entries: SERVER_IP; DOMAIN; and TYPE. When an entry is inserted into the DNS cache (block 818), if a previous entry appears under the same key, the new entry replaces the previous entry with the same key.

If the response in block 810 is not EMPTY and not NXDOMAIN, then the final answer for the DNS lookup was received. As shown by block 822, this answer is formatted for insertion into the DNS cache 208, and flow resumes at block 816 where the TTL entry is created, the entry is inserted into the DNS cache as shown by block 818, and as shown by block 820, directs the flow to the INITIALIZE_THE_QUERY in MAIN, so that with this addition to the cache, the domain can for sure be resolved directly from the DNs cache.

Figure 11:
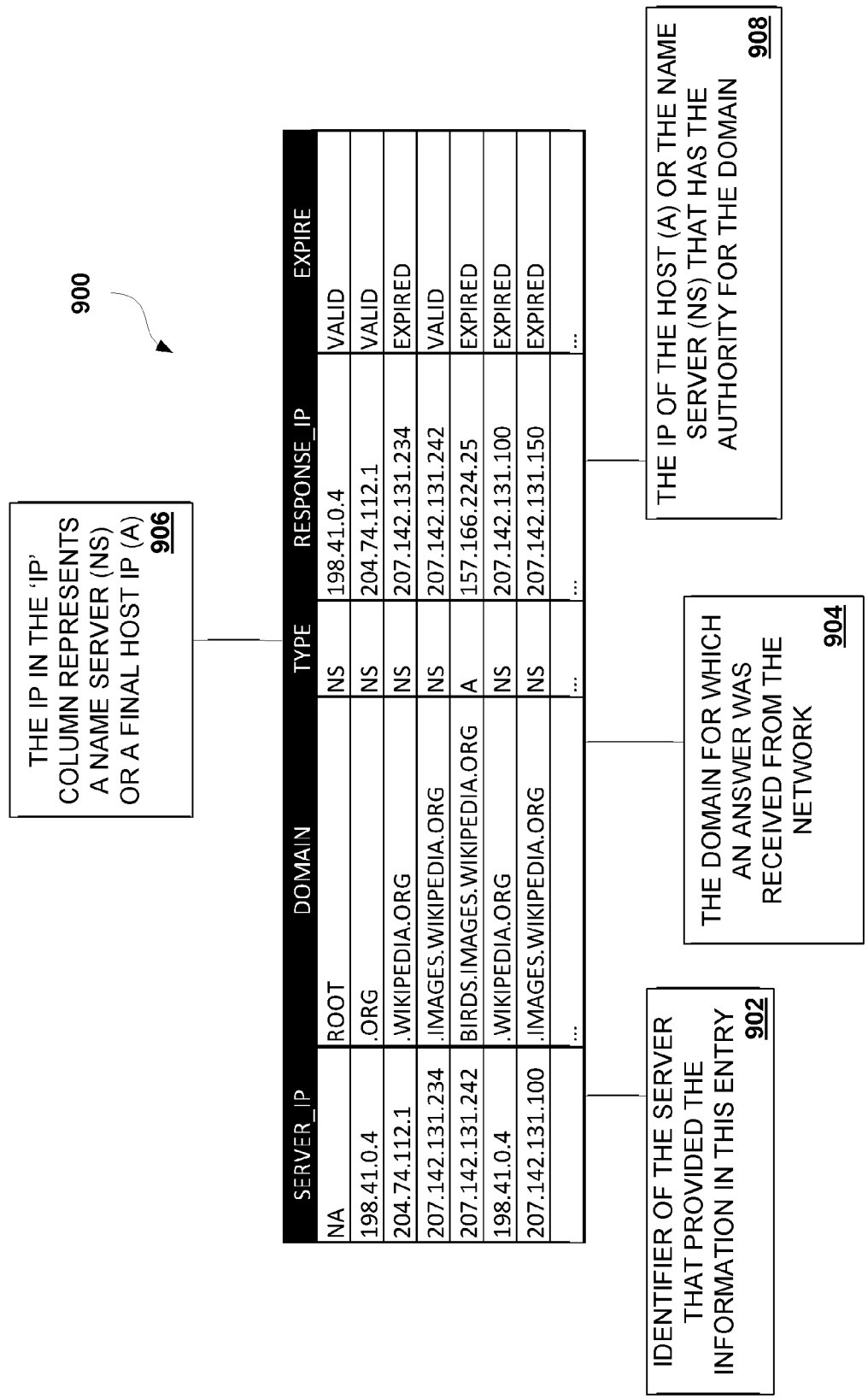
FIG. 11 is a diagram illustrating a typical caching DNS recursor's cache.

FIG. 11 describes at a high level a cache system of a DNS recursor or resolver. The key of the cache is typically the SERVER_IP 902 (the IP of the server that returned the answer that is cached in this entry) and DOMAIN 904 (the domain which was requested of the server who's IP is SERVER_IP). The TYPE 906, RESPONSE_IP 908 and EXPIRE 910 fields are the data of the cache, where TYPE is the type of the response received as described by the DNS protocol (NS, A, etc.), the RESPONSE_IP is the IP that was provided as an answer by the authoritative domain name server to be the IP of the host (in case of a TYPE=A answer) or of the next level authoritative domain name server (in case of a TYPE=NS answer), and the EXPIRE field states whether this entry is still valid at this time, based on the expiration field that was received with the answer at the time it was received by the system.

It should be noted that the abovementioned three exemplary embodiments of the invention may instead be combined. Specifically, any combination of the three exemplary embodiments may be utilized.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A system for resolving domain name system (DNS) queries, comprising:
   a communication device configured to resolve DNS queries, wherein the communication device further comprises a memory and a processor that is configured by the memory;
   a cache storage for use by the communication device; and
   a network of authoritative domain name servers,
   where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to.

2. The system of claim 1, wherein if the query sent to the authoritative domain name server that the expired DNS entry belongs to returns the same answer as the expired DNS entry stored within the cache storage then the communication device uses a final result received when it used the expired DNS entry to resolve the DNS request.

3. The system of claim 1, wherein if the query sent to the authoritative domain name server that the expired DNS entry belongs to returns a different answer than the expired DNS entry stored within the cache storage then the result received by using the expired DNS entry from the cache is ignored and the new DNS entry is used to resolve the DNS query.

4. The system of claim 1, wherein the cache storage is located within the communication device.

5. The system of claim 1, wherein the cache storage is located remotely from the communication device.

6. The system of claim 1, further comprising an external DNS recursor, and wherein the process of the communication device looking up a DNS request within the cache storage further comprises the communication device communicating with the external DNS recursor and the external DNS recursor directly looking up the DNS request within the cache storage.

7. The system of claim 1, wherein the process of the communication device continuing the process of looking up the DNS request in its cache while, in parallel, sending out a concurrent DNS request to an authoritative domain name server that the expired DNS entry belongs to, is repeated each time that the communication device views an expired DNS entry within the cache storage.

8. A system for resolving domain name system (DNS) queries, comprising:
   a communication device configured to resolve DNS queries, wherein the communication device further comprises a memory and a processor that is configured by the memory;
   a cache storage for use by the communication device; and
   a network of authoritative domain name servers,
   wherein for each set of authoritative domain name servers within the network of authoritative domain name servers that exist for a DNS request, the communication device queries more than one authoritative domain name server in parallel and uses a first answer received from the set of authoritative domain name servers as a final answer to that DNS level request.

9. The system of claim 8, wherein the cache storage is located within the communication device.

10. The system of claim 8, wherein the cache storage is located remotely from the communication device.

11. A system for resolving domain name system (DNS) queries, comprising:
    a communication device configured to resolve DNS queries, wherein the communication device further comprises a memory and a processor that is configured by the memory;
    a multitude of DNS recursors that are available to the computing device through a network; and
    a DNS resolver located within the communication device;
    wherein the DNS resolver of the communication device contains a list of a multitude of DNS recursors that are available to the communication device through the network and when the DNS resolver needs to do a DNS lookup, the DNS resolver queries more than one of the multitude of DNS recursors concurrently and uses the result from the DNS recursor that first provides an answer.

12. The system of claim 11, wherein the list of DNS recursors is created by querying local interfaces of the communication device to find a default recursor for each such interface.

13. The system of claim 12, wherein DNS recursors within the multitude of DNS recursors that are available on the network are manually configured in the system.

* * * * *